United States Patent [19]

Edwards

[11] Patent Number: 5,067,932
[45] Date of Patent: Nov. 26, 1991

[54] DUAL-INPUT INFINITE-SPEED INTEGRAL MOTOR AND TRANSMISSION DEVICE

[76] Inventor: Jonathan R. Edwards, 39 E. Patuxent Beach Rd., California, Md. 20619

[21] Appl. No.: 618,934

[22] Filed: Nov. 28, 1990

[51] Int. Cl.$^5$ ............................................. F16H 3/72
[52] U.S. Cl. .......................................... 475/5; 475/9; 180/65.5
[58] Field of Search ................... 180/65.5; 475/5, 9, 475/150

[56] References Cited

U.S. PATENT DOCUMENTS

| | | | |
|---|---|---|---|
| 1,172,456 | 2/1916 | Hoadley | 180/65.5 X |
| 3,161,083 | 12/1964 | Roe | 475/5 |
| 3,923,115 | 12/1975 | Helling | 180/65.2 |
| 4,729,258 | 3/1988 | Mohri et al. | 475/9 X |

FOREIGN PATENT DOCUMENTS

0083557 7/1983 European Pat. Off. ............ 180/65.5

*Primary Examiner*—Dirk Wright
*Attorney, Agent, or Firm*—Wm. D. Johnston, III

[57] ABSTRACT

A combination electric motor and transmission unit device has two inputs and a rotational mechanical output, at least one of the inputs being of electrical power, to a corresponding integral combination of an electric motor means with a transmission means. The directions of rotation and the rotational speeds of the two inputs can be controlled to provide the mechanical output at any desired rotational speed with peak power output, depending on the controls, thus providing an ideal infinite speed device. The device employs a novel arrangement of a differential unit or a planetary gear unit. The combined motor and transmission device is lightweight, requires a small number of moving parts, and is useful in vehicles powered by electricity, including for regenerative braking. Another embodiment of the drive device is useful for a flywheel for peak power supplementation and also regeneration.

24 Claims, 6 Drawing Sheets

Down for distribution to drive wheels

DUAL-INPUT INFINITE-SPEED INTEGRAL MOTOR AND TRANSMISSION DEVICE

BACKGROUND OF THE INVENTION

The present invention relates generally to an integrally formed combination of a motor device and a transmission device, having two power inputs and a power output having a continuously variable speed of rotation over a large range. The invention employs novel uses of a differential unit or a planetary gear unit. It is useful for rotating a drive e wheel of an electric vehicle, or as a flywheel unit for power storage and delivery in a conventional vehicle.

It has long been a goal in the art to find a combination power source (i.e., drive) and transmission device that can deliver the peak output of the power source over a large range of the rotational speed (rpm) output of the transmission device. Further, it is preferable that this peak power be output from the transmission device, or from the drive device incorporating the transmission device, at continuously variable speeds of rotation over a large range of the speed of rotation of the output. A transmission device making possible such properties is known in the art as an infinite speed transmission device. The term "drive and transmission device" or "combination motor and drive device" is employed in the present disclosure to describe the case of the device including the drive means (i.e., power source means) as well as the transmission means. The term "motor and transmission device" or "combination motor and transmission device" is employed for the case of the drive means including an electric motor means, as the drive means (i.e., power source).

Known transmission devices typically involve a single rotational mechanical input and a single rotational mechanical output. Such known transmission devices, whether manual or automatic, may typically employ a set of gears. In these transmissions, the ratio of the speed of rotation of the input to the speed of rotation of the output is one of a set of fixed values corresponding to the set of gears. These typically involve a large number of parts, undesirable weight for many applications particularly in vehicle propulsion, and high losses due to multiple transfers of the power between the many components within the transmission device, or within the drive device incorporating the transmission device.

The mechanical rotational input for such known transmission devices can be the output of a gasoline or electric motor, many of which typically have a limited speed (rpm) range for peak power. As a result, the transmission device may not have a continuously variable output rotational speed for the speed of the motor in the peak power range.

The effective range over which the peak power output can be maintained increases with the number of gears in the transmission device, but only in the sense that the range is made up of overlapping sub-ranges, each sub-range being a narrower rpm range over which the peak power is output when the known transmission device is in a respective one of the gears. However, the larger the number of gears, the heavier and more expensive the transmission device becomes, and the less efficient due to the number of interfaces (mechanical links) across which the power must be transferred.

Differential units and planetary gear units are known in the art as transmission devices. The typical use of a differential transmission unit is in a vehicle, to distribute the power from the drive shaft to the pair of drive wheels. In this use the rotational mechanical input of the drive shaft is transmitted by a gear fixed on the end of the drive shaft to a ring gear of the differential transmission unit. The ring gear is attached to a frame which holds a pair of pinion gears to rotate between a pair of drive gears. Each of the drive gears is fixed to a shaft to turn a respective one of the two drive wheels. The two drive gears rotate coaxially, and the output rotates about an axis transverse to the axes of the drive gears.

Rotation of the pair of pinion gears between the drive gears allows the two wheels to rotate independently while both drive the vehicle. The amount of rotation of the pair of pinion gears corresponds to the difference in rotation between the two drive wheels, such as for going around corners or when one of the drive wheels loses traction.

Known planetary gear types of transmission devices involve an inner sun gear, an outer ring gear and a set of planetary gears held by a hub to rotate between the sun gear and the ring gear. When the sun gear rotates with respect to the ring gear, the planetary gears rotate between them, and the hub rotates accordingly, coaxially with the sun and ring gears.

In a typical prior art use of the planetary gear unit, the hub is fixed, and either the sun gear or the ring gear is driven as the rotational mechanical input, the other providing the rotational mechanical output. Alternatively, either the sun gear or the ring gear can be fixed, the other is either the rotational mechanical input or output, and the hub provides the other of the rotational mechanical input or output.

In the prior art, combinations of a transmission device and an electric motor drive device typically involved use of a separate electric motor, the shaft of which extends to provide a rotational mechanical input to the transmission device. The shaft is typically supported by two bearings at two separated parts of the shaft, the motor elements being located between the positions of the bearings.

The prior art does not involve combining any of the essential elements of the electric motor means integrally with the essential elements of the transmission means, nor the supporting of the element of the electric motor with a single bearing. Thus the prior art arrangements for combined motor and transmission means involved a large number of parts and an undesirable associated weight.

SUMMARY OF THE INVENTION

An object of the invention is to provide an infinitespeed combination motor and transmission device, namely which can deliver peak power output with a continuously variable speed of rotation over a very large range of the rotational speed of the output.

Another object of the invention is to provide an infinite speed combination motor and transmission device having two inputs, at least one of the inputs being an integral combination of an electric motor element and a transmission unit element.

Yet another object of the invention is to provide a combination motor and transmission device employing a novel arrangement of differential transmission unit or a planetary gear unit.

A further object of the present invention is to provide a combination motor and transmission device for each drive wheel of an electric powered vehicle, wherein each device has two power inputs including at least one which involves an integral combination of an electric motor means and a transmission means, for effectively propelling the vehicle.

Another object of the invention is to provide a combination motor and transmission device which can be located within the wheel assembly of a wheel of an electrically powered vehicle.

Another object of the invention is to provide a combination motor and transmission device, for driving a wheel of an electrically powered vehicle, which is lightweight and highly efficient, as a result of a small number of parts, low losses and regenerative braking with antilock braking easily adapted 11/28/90.

Yet another object of the present invention is to provide a flywheel unit employing the combination motor and transmission device of the present invention in a conventional vehicle, for storing power for supplementing peak power when needed, and as well for regenerative braking.

BRIEF DESCRIPTION OF THE DRAWINGS

FIGS. IA and IB show an electric-powered vehicle having a combination motor and transmission device of the present invention, fitting within the wheel assembly of each of the wheels, for propelling the vehicle.

DESCRIPTION OF THE PREFERRED EMBODIMENTS

The present invention will be understood from the detailed description of the specific embodiments hereinbelow and from the respective drawings. The description and drawings of the embodiments are for explanation only, and are not intended in any way to limit the invention.

Figure 1A:
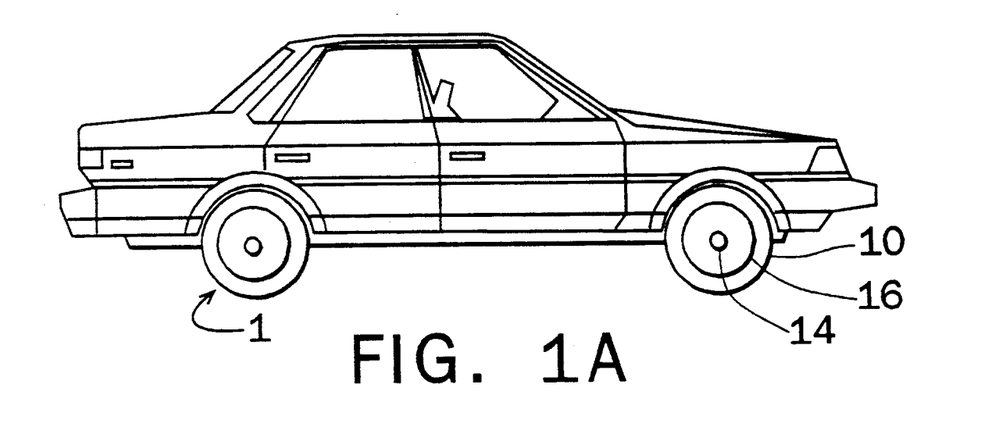
Figure 1B:
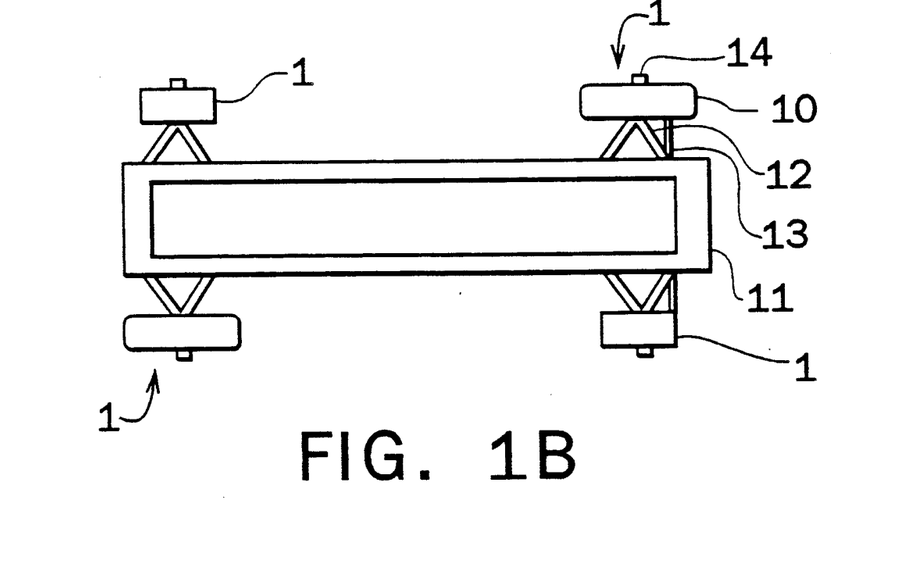

An electrically powered vehicle, having for instance its four wheels 10 driven by four respective ones of the combination motor and drive transmission devices 1 of the present invention, is shown in FIGS. 1A and 1B. As is shown only schematically, the four suspension units 12 are connected to the undercarriage or supporting frame 11 of the vehicle, and each is connected at its other end to the motor and transmission device 1 which is provided for the respective wheel 1. The steering members 13 connecting to the two front wheels 10 provide for steering the vehicle. Conventional means may be employed for the suspension and steering members 12, 13.

In the illustrated embodiment, each combination motor and transmission device 1 is incorporated with the wheel assembly, effectively within the space about which the tire rotates. The output of each combination motor and transmission device 1 is along the hub 14, to which the wheel disc 16 is connected, the wheel disc extending radially outward for connection to the rim on which the tire 10 is mounted.

Figure 2:
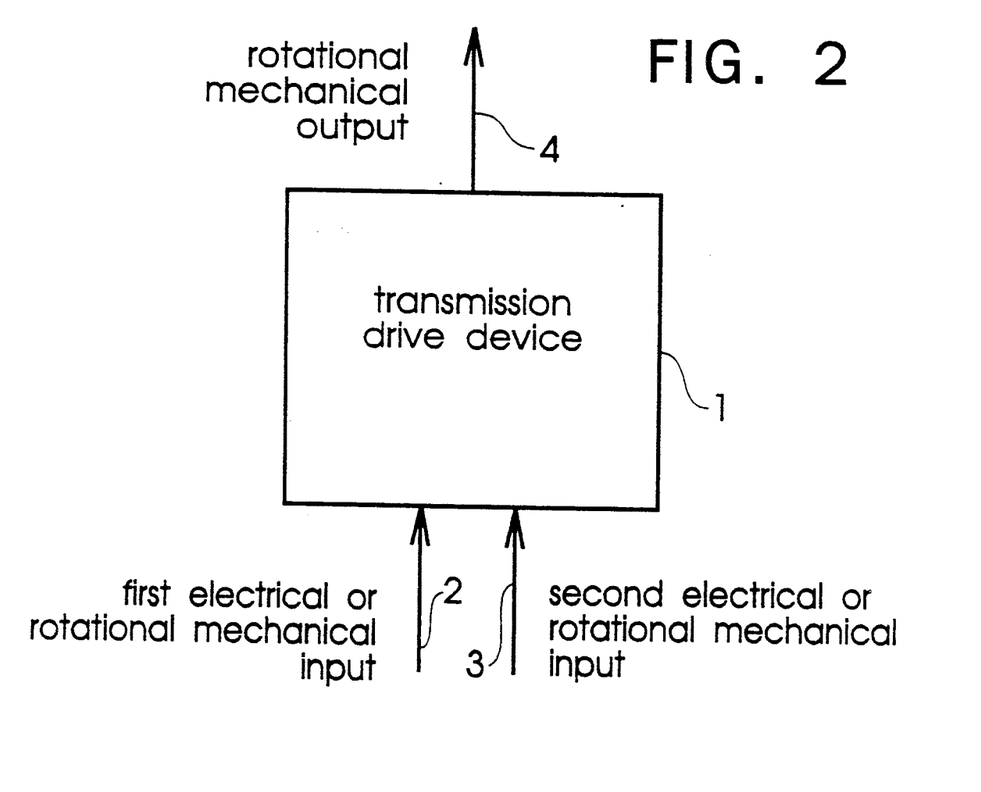
FIG. 2 shows the general characteristics of the combination motor and transmission device of the present invention, having at least one and preferably two inputs of electrical power and a rotational mechanical power output.

The generic features of the combination motor and transmission device 1 of the present invention are indicated in FIG. 2. The two inputs 2, 3 are for input of power. At least one of these inputs 2, 3 is an electrical power input, to drive an integrally formed combination of an electric motor element and a transmission unit element within the device 1. For instance, the electric motor element might be the armature of the electric motor, mounted on the rotating ring gear as the essential element of a differential unit transmission, as discussed next for FIG. 3. Alternatively, the essential electric motor element could be the field assembly, and the essential motor element another part of the transmission unit. The rotational mechanical power output 4 is at a continuously variable speed, such as from a negative maximum value to a positive maximum value in various embodiments of the present invention.

Figure 3:
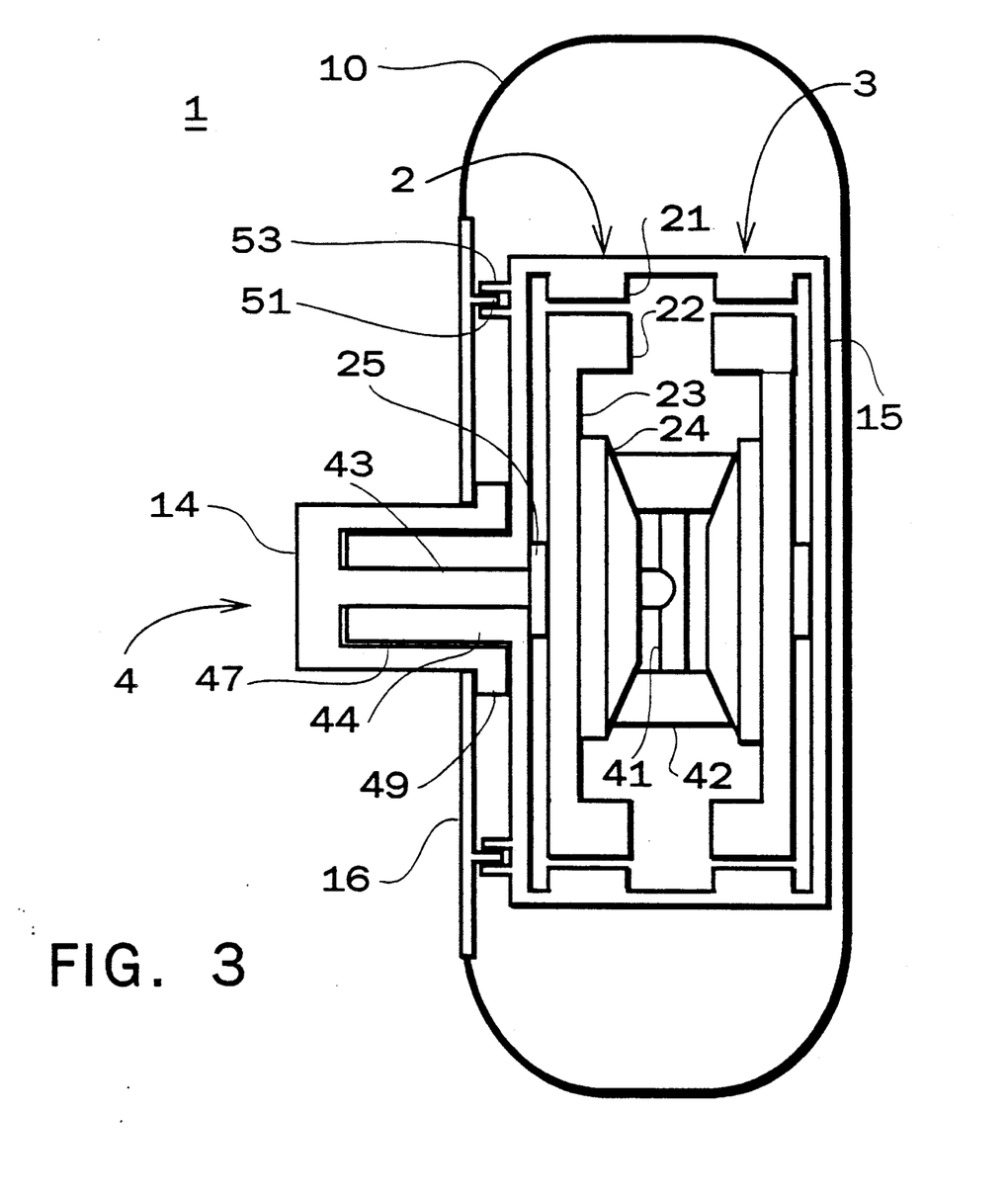
FIG. 3 shows an embodiment of the combination motor and transmission device of the present invention employing a differential unit.

FIG. 3 shows an embodiment of the combination motor and transmission device 1 of the present invention employing a differential unit in a novel manner. The device 1 includes a half 15 of a housing which, when the device is employed in an electric vehicle as in FIG. 1A, may be fixed directly to the suspension member 12, and to the steering member 13 in the case of the wheel being rotated for steering, or to some other appropriate member of the vehicle.

The two inputs 2, 3 to the motor and transmission device 1 are located below the corresponding arrows. In this embodiment the inputs are in the form of electrical power which is converted internally to mechanical power. The output 4 for rotating the drive wheel 10 is via the wheel shaft 43, which is fixed at its outer end to the wheel hub 14 for rotating it. The wheel disc 16 is connected by bolts (not shown) to a circularly shaped perimeter portion 49 of the hub 14, for rotating the wheel 10. The outer peripheral edge of the wheel disk 16 is connected to a rim (not shown) on which the tire is mounted.

This wheel assembly is known in the art as a floating hub type. As is known, the weight of the load on the wheel 10 is transmitted by bearings (not shown) from the interior surface 47 of the hub 14 to the outside cylindrical surface of the spindle 44. The spindle 44 is hollow, to allow the steel shaft 43 to rotate freely within it, to deliver the rotational force for rotating the wheel 10 free from the weight of the load on the wheel 10.

Turning to the invention, the input 2 includes for instance a field element 21 fixed on the interior of the housing portion 15, to interact with for instance an armature element 22 fixed on the outer periphery of a circular disk 23, which is shown edgewise in FIG. 3. Although not shown in FIG. 3, a plurality of the field elements 21 are spaced around the interior of the housing 15, and a plurality of the armature elements are provided around the periphery of the disk 23.

The disk 23 is supported by a bearing 25 fixed on the housing 15, and is accordingly forced to rotate about an axis collinear with the wheel 10. Mounted fixedly on the disk 23 is a drive gear 24, a cylindrically bevelled front of which is grooved to form gear teeth. In this embodiment, input 3 has essentially the same components as input 2, as is indicated in FIG. 3.

Proceeding to the output 4, the pinion gear shaft 41 holds the pair of pinion gears 42 to rotate between the opposing drive gears of the inputs 2 and 3, namely the drive gear 24 on input 2 and the corresponding drive gear on input 3 indicated in FIG. 3. The pinion gear shaft 41 is rigidly (non-rotatingly) connected at a right angle and at its center to the wheel shaft 43 for rotating the wheel 10.

When the bevelled drive gear 23 on input 2 and the corresponding opposing drive gear on input 3 are driven by the electrical inputs to rotate at the same speed, then the pinion gears 42 do not rotate on the pinion gear shaft 41. In this case, the pinion gear shaft 41 rotates at this same speed (in a plane perpendicular to the paper), and the wheel 10 is also rotated at this rotational speed. When the two opposing bevelled gears are driven at different speeds, including the case of opposite directions, then the pinion gear shaft 41 is caused to rotate at a speed intermediate between the rotational speeds of the two opposing bevelled drive gears, by virtue of the pinion gears 42 rotating on the pinion gear shaft 41.

The wheel 10 is thus driven at its maximum speed, in either the forward or reverse direction, when the two inputs 2 and 3 are in the same direction, forward or reverse, and at their respective maximum speeds. As the speed of one decreases, the wheel 10 slows down. Thus the speed with which the wheel 10 can be rotated is continuously variable, from full forward speed to full reverse speed.

If the source of electrical power is a battery, then the wheel 10 can be driven with full battery power at any speed in the range between full forward and reverse speeds. As is explained in the following, the combination motor and transmission device 1 can provide full power to the wheel 10 while rotating it at any speed in this large range, thus being an effective and efficient infinite speed transmission device.

If the two inputs 2, 3 are driven at nearly equal but opposite speeds, then the wheel 10 is rotated at very low speed, but with very high available torque, corresponding to the available peak power from the battery. For each such output speed below the extreme maximum forward speed and the extreme maximum reverse speed, there is in fact a continuum of combinations of the speeds of the two inputs 2, 3.

The width of this continuum of combinations, that is, the effective number of the combinations for any one output speed, increases with decrease in the output speed below the maximum speed. Thus, different control strategies can be selected, in controlling the change in speed of the output, depending on the characteristics of the power sources for the inputs and of the load.

The transmission and drive device of the present invention is small and lightweight enough to fit with the rest of the wheel assembly within the interior space of the wheel. It is small and lightweight, since a variety of lightweight materials could be used for its construction. It is estimated that the transmission and drive device of the present invention could weigh as little as 35 or 40 lbs or less, and have outside cylindrical dimensions of for instance 14 inches in diameter by 8 inches from end to end, or smaller.

By being small enough to fit with the wheel assembly within the wheel, the devices of the present invention allow the steering and suspension geometry for the vehicle to be correct. This is generally very important in vehicle design. By being lightweight, the unsprung weight of the vehicle remains small. By removing the drive devices entirely from the vehicle body, this frees up use of the body of the vehicle for other purposes, including battery placement.

A braking means is indicated in FIG. 3, by the band or lip (drum) 51 extending horizontally from the wheel disk 16. This band 51 extends between the pair of calipers 53 for clamping onto it, for providing the braking force. Thus, effectively the entire device, including brake means, fits within the space of the normal wheel assembly, in the interior space of the wheel.

Other arrangements for bearings to support the wheel shaft 23 and the disk 23 may be used. For simplicity, two further embodiments of the transmission and drive devices of the present invention are described in the following with the wheel shaft 43 connecting directly to the wheel 10, with the wheel being outboard of the device 1. It is clear that these other embodiments could be provided similarly to that of FIG. 3 if desired, namely with the device 1 provided within the space inside the wheel.

Figure 4:
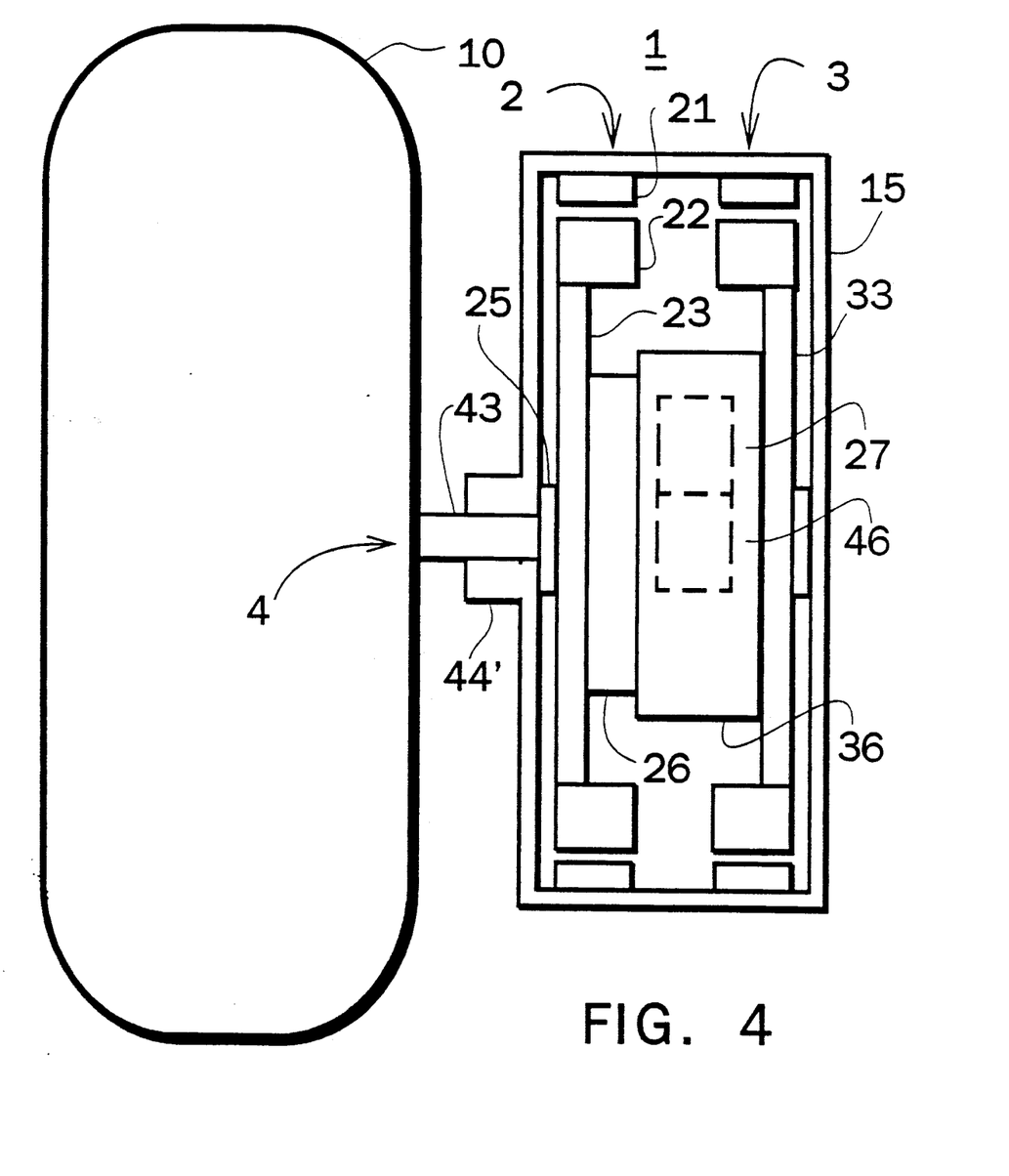
FIG. 4 shows an embodiment of the combination motor and transmission device of the present invention employing a planetary gear unit.

FIG. 4 shows an embodiment of the transmission device of the present invention employing a planetary gear unit. Parts identical to those of the embodiment of FIG. 3 are shown with the same reference numbers, and are not described again. The simplified output 4 shows the wheel axle 43 supported by a bearing half 44 ' connected to the housing half 15. The significant differences arise in replacing the differential gear unit with the planetary gear unit.

The outermost member of the planetary gear unit is the ring gear, the teeth of which are on the inside periphery of the hollow cylindrical member 36. The right end of the cylindrical member 36 can be closed, but in any case is rigidly fixed, in this example, to the disk 33 of input 3, to rotate with it.

Inside the ring gear member 36 are located the sun gear 46 (indicated with dotted lines only) and the hub. A portion 26 of the hub is shown extending to the left for rigid connection to the disk 23 of input 2. Both the sun gear 46 and the hub (with its portion 26) rotate coaxially with the ring gear 36. The wheel shaft 43 extends to the right to connect rigidly with the sun gear 46, to rotate with it. The spacer 26 typically has at least three planetary gears 27 (only one is indicated by the dotted lines in FIG. 4) attached to it to rotate between the sun gear 46 and ring gear 36.

Figure 5:
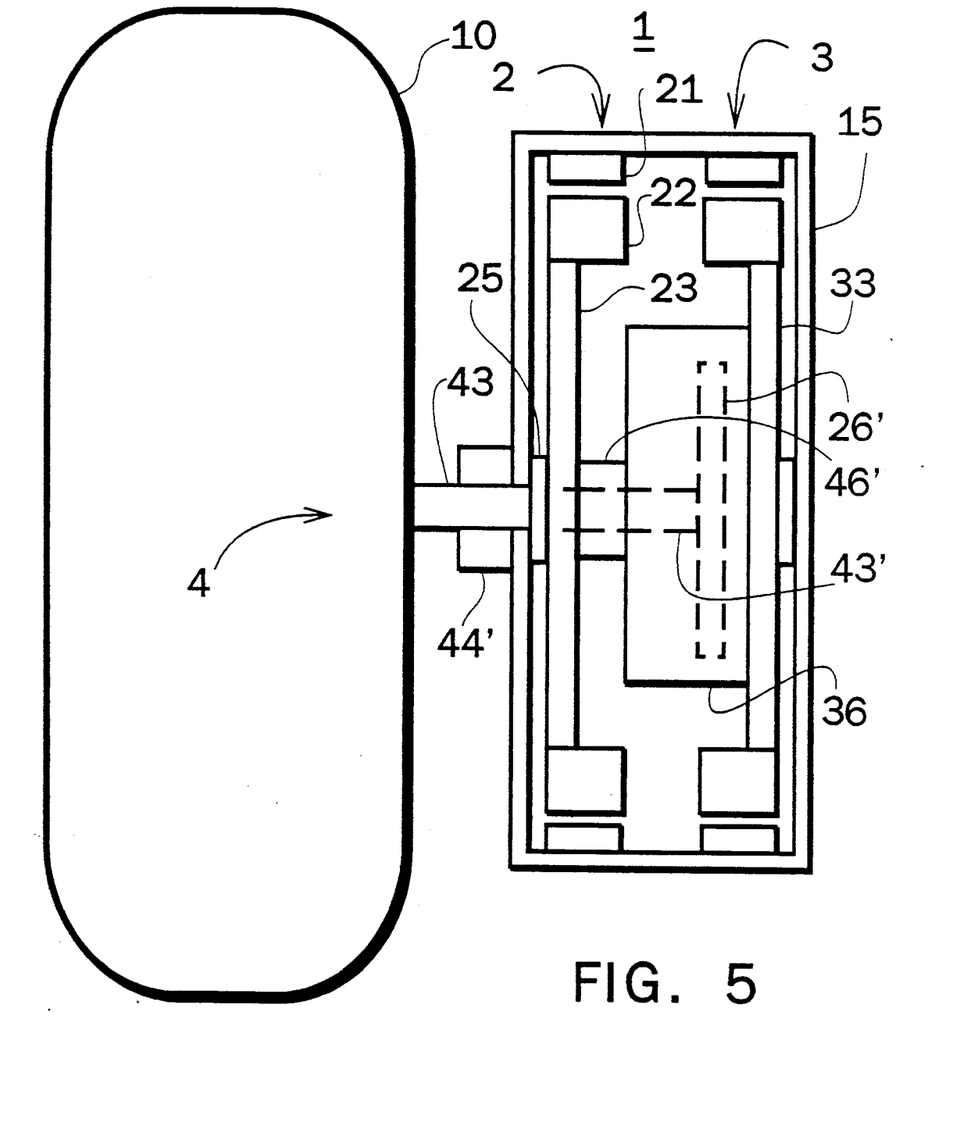
FIG. 5 shows another embodiment of the combination motor and transmission device of the present invention employing a planetary gear unit.

FIG. 5 shows another embodiment of the transmission device of the present invention employing a planetary gear unit. Here the disk 23 of the input 2 is rigidly connected to an extension 46' of the sun gear, so as to turn the sun gear when the input 2 is activated. The sun gear and its extension 46' are cylindrically hollow along the axis of the sun gear, to allow an extension 43' (indicated by dotted lines) of the wheel shaft 43 to extend to the right along its axis to connect rigidly and nonrotatingly with the hub 26' of the planetary gear set.

The planetary gear unit embodiment of FIG. 4 has a higher output speed than that of FIG. 5, assuming equal maximum speeds of the two inputs in each case. Namely, in the embodiment of FIG. 4, the output rotational speed is some weighted sum of the input speeds, the weights depending on the relative diameters of the gears of the planetary units. Specifically, in the embodiment of FIG. 4 the output speed can easily be larger than either input speed. This embodiment can thus be considered to have a high speed capability, namely to have some "overdrive" characteristic, even while maintaining a powerful "low gear" characteristic.

By contrast, the embodiment of FIG. 5 should be considered to be more of a "low gear" device, since the output speed cannot exceed that of either input. Namely, like the differential unit embodiment of FIG. 3, the maximum output speed occurs when both inputs are at the maximum speed in the same direction.

This latter feature involves the most important distinction between the embodiments of FIGS. 4 and 5, namely the embodiment of FIG. 5 is much more efficient than that of FIG. 4, at least at top speed, when the two inputs to the device 1 are such that the two discs 23 and 33 rotate at the same speed. In this case, the hub and the planetary gears held by the hub (not shown in FIG. 5, but see the hub 26 and the indicated planetary gear 27 in FIG. 4) do not rotate, with respect to the sun gear 46 and ring gear 36, but rather rotate with them. Thus there is no loss as occurs when these do not rotate together, as in the embodiment of FIG. 4 at top speed when the relative motion of the planetary gears 27 and the hub 26, and the associated losses, are large.

The rotational mechanical output of the transmission drive device can be provided at any desired rotational speed, power or torque, depending on the load and the controls for the two inputs. Any type of electrical motor can be incorporated into each input, for converting electrical power supplied to the motor to rotating mechanical power of that input.

As shown in FIGS. 3, 4 and 5, a feature of the present invention is that an essential electric motor element, such as the armature element 22, is integrally connected with an essential transmission unit element, such as the drive gear 23 in FIG. 3, the hub 26 in FIG. 4 or the sun gear 46 (via the extension 46') in FIG. 5. This is a most effective approach for reducing the number of components, size and weight of the motor and transmission device. This reduction includes a reduction from the number of bearings required in the prior art to support both ends of the motor output shaft, namely the shaft which then serves as a rotational mechanical input to the transmission device in prior art combination. As can be seen from the drawings, there are little sideways forces acting on the illustrated essential elements of the transmission means, so further bearings are not necessarily needed. Thus, a single bearing can be made, by appropriate design in each specific case, to suffice for the essential transmission part carrying the essential electric motor part with which it is combined. Namely, most of the loading can effectively be provided in a single plane perpendicular to the axis of rotation of the essential transmission part.

A stepping motor is particularly useful for controlling the angular position as a function of time, and accordingly the speed, of the rotational mechanical inputs, to allow controlling the speed of the rotational mechanical output to a desired value. As is known in the art, the torque output of a stepping motor typically falls with increasing rotational speed, from a maximum torque at zero or low rpm. By contrast, the typical power output of a stepping motor quickly rises with increase in rpm from zero to a plateau value of the output power, namely power output remains at this plateau for a very large range of rpm.

Thus, when two stepping motors are employed in the two inputs of the transmission drive device of the present invention, the sum of the peak powers of the two stepping motors is effectively available at the output, when each motor is driven at a rotational speed above the minimum speed for providing the plateau value for its peak power output.

As is easily understood, this total peak power output of the transmission device of the present invention is available at any output speed. Accordingly, at low output speed, the output torque can be very high.

A stepping motor is particularly advantageous for use in the drive devices of the present invention which might be employed in a battery powered vehicle. It is lightweight and efficient, and is easily controlled to provide a desired output rotational speed (rpm). Its high efficiency is nearly constant over its large rpm range, unlike most other electric motors, many of which substantially lose overall efficiency as they are slowed down. Also, the stepping motor has high torque at low rpm, unlike many other types of electric motors. Most other motors cannot be slowed substantially and run backwards.

A relatively low top speed (rpm) of the electric motors acting as inputs 2, 3 would be required for use in the illustrated embodiments, all of which employ a one to one ratio of armature rotation to wheel rotation. Thus, for the normal tire size, a top speed of 800 to 1000 rpm would generally suffice for most purposes, for each rotational mechanical input 2, 3.

Use of a computer to control the stepping motors in the drive device of the present invention would easily allow for cornering, such as by driving the two front wheels that are being steered at different output speeds depending on the radius of the turn as sensed by the computer, such as by the angle to which the steering wheel is turned by the driver. Individual control of the speed of each drive wheel is effective for avoiding loss of traction and corresponding spinning of a drive wheel, as occurs frequently for instance with cars in the prior art employing differential transmissions for power distribution between pairs of drive wheels.

An important advantage of the present invention is that the braking of the vehicle can be performed by the drive devices of the present invention being used as generators, namely by regenerative braking. In the case of a battery powered car, the kinetic energy of the vehicle can be converted back into useable electricity charged back into the battery, and hence available for subsequently propelling the car. Thus, a small lightweight hydraulic brake, such as on each wheel, suffices as backup and emergency brakes for the vehicle.

The infinite-speed characteristic of the combination motor and transmission device of the present invention is particularly useful for this purpose, namely in being able to adjust the device for maximum regeneration. In generic terms this involves converting the output 4 above into an input, and the two inputs 2, 3 into two outputs, or one output and one input.

Increased braking power could be obtained by operating the combined motor and transmission device so that a very high rpm of at least one of the two inputs drives the respective electric motor element for regeneration of a lot of power. If the controls are set for this same "high gear" regeneration mode, an effective parking brake is provided, at the cost of a small current drain, while the vehicle is parked.

Some considerations for controlling electrical power inputs to the combination motor and transmission device of the present invention are as follows. A first control strategy for operating the device of the present invention for bringing a vehicle to speed from standstill is simple. Each rotational mechanical input 2, 3 would start at zero rpm, and be speeded up to speed together, thus avoiding any relative rotation of the pinion gears 42, for the embodiment of FIG. 3.

A more complex approach for the embodiment of FIG. 3 would be to start with both rotational mechanical inputs 2,3 at the same speed but in opposite directions, and to slow one more than the other until at top speed of the vehicle the two mechanical inputs are rotating together in the same direction. This in effect provides a flywheel-type supplementation of the peak power from the battery by taking kinetic energy stored in advance in one of the rotating disks 23, 33.

Figure 6:
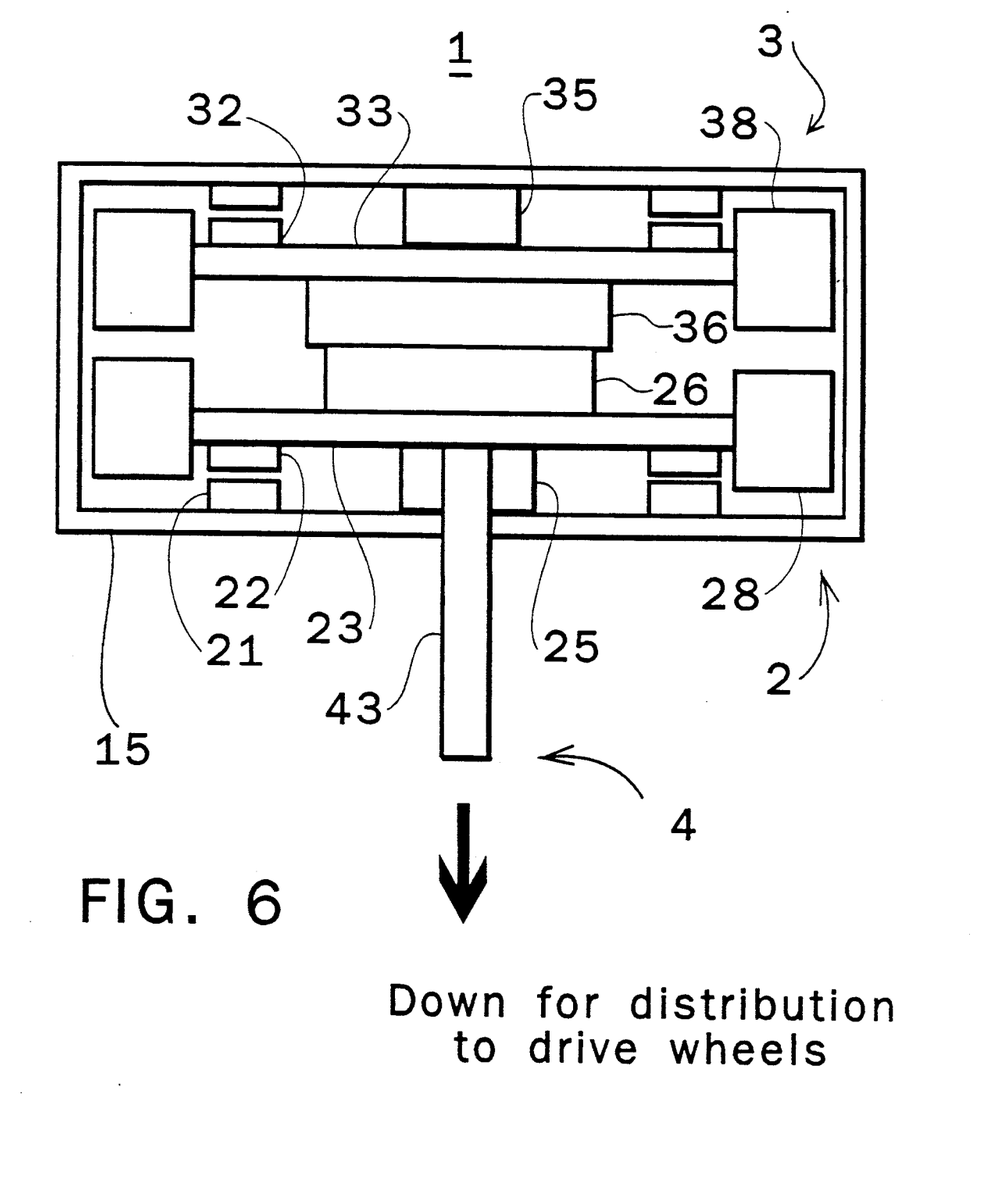
FIG. 6 shows a flywheel embodiment of the combination motor and transmission device of the present invention, for storing and providing energy for propelling a vehicle.

FIG. 6 shows another embodiment of the present invention for use as a flywheel for storing energy and supplying same when needed. This shows a combination motor and drive device 1 having two inputs 2, 3 of electrical energy and an output 4 of rotational mechanical energy, which however can be reversed in the sense of what constitutes an input or output, as mentioned above for the preceding embodiments in the case of regenerative braking.

However, the purpose of this embodiment is to store energy for times of peak power need, such as for either foreseen or unexpected acceleration events, or for mechanical storage of kinetic energy obtained when the vehicle was braked, by speeding up the flywheel by the braking process itself to convert the kinetic energy of the entire vehicle to kinetic energy of the one or more flywheels contained in the combination motor and transmission device 1. Various designs can be suited to these various purposes. It suffices to describe the embodiment of FIG. 6 as directed to supplementation of peak power only.

The input 2 includes the field assembly units 21 distributed about the inside of the half 15 of the housing, and the armature units 22 located on the top side of the disk 23 (shown edgewise) which has a heavy cylindrical peripheral mass 28 for increasing the moment of rotational inertia. Input 3 has similar components. This embodiment shows the ring gear 36 and hub 26 of the planetary unit embodiment of FIG. 4, respectively connected to the disks 33 and 23.

The output 4 is by the vertical shaft 43 which leads downwards for engagement with the drive wheels, such as by a pinion gear on the end of the shaft 43 engaging a ring gear of a differential unit connecting the two drive wheels. This combination motor and transmission device 1 could be employed in the ordinary vehicle having a differential unit connecting the two drive wheels.

The present invention is limited only by the scope of the following claims, and not by any specifics of the embodiments disclosed above. Numerous modifications and variations of the above embodiments will be apparent to a skilled worker in the art in possession of the present disclosure, and as well other embodiments within the scope of the present invention.

What is claimed is:

1. A combination motor and transmission device comprising
   first power input means for receiving a first input of electrical power,
   second power input means for receiving a second input of electrical power, and
   power conversion means for converting said electrical power of said first and second inputs for output, said power conversion means including a mechanical power transmission unit, said power transmission unit having two inputs for respectively receiving mechanical power corresponding to said first and second power inputs provided to said first and second power input means and an output for outputting the converted power as rotational mechanical power,
   wherein the rotational speed of said output is continuously variable, and said power conversion means includes, for each of said first and second power inputs, a respective integral combination of a respective electric motor element and an element of said mechanical transmission unit, each said integral combination involving said two respective elements thereof being directly associated mechanically and geometrically with each other without substantial spacing or other elements including bearings and shafts therebetween.

2. The combination motor and transmission device of claim 1,
   wherein said transmission unit comprises a differential unit which includes
   a pair of opposing drive gears corresponding to the two inputs of said transmission unit,
   a pair of pinion gears rotating on a first shaft between said pair of opposing drive gears,
   a second shaft connected at a first end perpendicularly to the center of said first shaft, the other end of said second shaft providing said rotational mechanical power output, and
   a housing surrounding at least in part said drive gears, pinion gears, first shaft and second shaft,
   wherein each said integral combination comprises a respective one of said drive gears as the respective element of said transmission unit.

3. The combination motor and transmission device of claim 2, comprising
   a first element of said first electric motor being an armature that is connected rigidly to a respective peripheral part of a first one of said pair of drive gears to rotate with said first drive gear,
   a first element of said second motor being an armature that is connected rigidly to a respective peripheral part of the second one of said pair of drive gears to rotate with said second drive gear,
   a second element of said first electric motor being a first field assembly that is connected mechanically to said housing at a location to interact by its field with said armature on said first drive gear, and
   a second element of said second electric motor being a second field assembly that is connected mechanically to said housing at a location to interact by its field with said armature on said second drive gear,
   wherein each said element of the respective one of said electric motors of each said integral combination is said armature thereof.

4. The combination motor and transmission device of claim 1, wherein said continuously variable rotational output is a result of at least one of said inputs having an associated rotational speed that is continuously variable.

5. The combination motor and transmission device of claim 1, wherein each said integral combination has a common central axis along which each of said two elements thereof is aligned, and each said integral combination is supported by a single respective bearing in the vicinity of said central axis and adjacent said housing.

6. The combination motor an transmission deice of claim 1, comprising
   a housing forming the exterior of power conversion unit,
   said mechanical power output means comprising a shaft extending out a central axis of said power conversion unit,
   a wheel assembly of the floating hub type, including a hollow spindle connected to said housing and extending coaxially with said central axis with said second shaft extending therein, and a wheel-support spindle connected to said second shaft,
   a wheel with rim and bearing means connected to an end of said shaft to rotate on said wheel-support spindle, and
   said shaft extending out from said housing to connect with said wheel via said rim and bearing means for rotating said wheel on said wheel support spindle.

7. A combination motor and transmission device, comprising
   first power input means for receiving a first input of electrical power,
   second power input means for receiving a second input of electrical power, and
   power conversion means for converting said electrical power of said first and second inputs for output, said power conversion means including a mechanical power transmission unit, said transmission unit having two inputs for respectively receiving mechanical power corresponding to said first and second power inputs provided to said first and second power input means and an output for outputting the converted power as rotational mechanical power,
   wherein the rotational speed of said output is continuously variable, sand said power conversion means includes, for each of said first and second power inputs, a respective integral combination of a respective electric motor element and an element of said transmission unit, each said integral combination involving one of said two respective elements thereof being at least to a large extend t within an envelope containing the other, whereby a compact structure is provided for each said integral combination, and said two integral combinations are located closely adjacent each other, 8. The combination motor and transmission deice of claim 7, wherein each said envelope is that of said respective motor element of the respective one of said integral combinations, and each said envelope has effectively a cylindrical symmetry with a length that is substantially shorter than its diameter.

9. The combination motor and transmission device of claim 8, wherein said transmission unit comprises a differential unit which includes
   a pair of opposing drive gears, corresponding to the two inputs of said transmission unit,
   a pair of pinion gears rotating on a first shaft between said pair of opposing drive gears,
   a second shaft connected at a first end perpendicularly to the center of said first shaft, the other end of said second shaft providing said rotational mechanical power output, and
   a housing surrounding at least in part said drive gears, pinon gear, first shaft and second shaft,
   wherein each said integral combination comprises a respective on e of said drive gears a the respective element of said transmission unit, each said drive gear being mechanically connected with the respective electric motor element.

10. The combination motor and transmission device of claim 8, wherein said transmission unit comprises a planetary gear unit which includes
    an inner sun gear,
    an outer ring gear which has an axis of rotation collinear with that of said inner sun gear,
    a set of planetary gears held by a hub, said planetary gears being held by said hub to rotate in unison between said inner sun gear and outer ring gear, said planetary gears rotating relative to said hub in dependence on the difference in rotation between said inner and outer gears, said hub rotating in dependence on the sum of two rotational velocity components, the first rotational velocity component being the common rotational velocity of said sun gear and said ring gear, and the second velocity component being the difference between the rotational velocity of said sun gear and said ring gear, and
    a housing surrounding at least in part said electric motors and transmission unit.

11. The combination motor and transmission device of claim 10,
    a first element of said first electric motor being an armature that is connected rigidly to a respective peripheral part of said ring gear to rotate with said ring gear,
    a first element of said second motor being an armature that is connected rigidly to a respective peripheral part of said hub to rotate with said hub,
    a second element of said first electric motor being a first field assembly that is connected mechanically to said housing at a location to interact by its field with said armature on said ring gear,
    a second element of said second electric motor being a second field assembly that is connected mechanically to said housing at a location to interact by its field with said armature on said hub, and
    a shaft connected to said sun gear to rotate with it as driven by said planetary gears, hub and ring gear,
    wherein each said element of the respective one of said electric motors of each said integral combination is said armature thereof.

12. The combination motor and transmission device of claim 10, comprising
    a first element of said first electric motor being an armature that is connected rigidly to a respective peripheral part of said ring gear to rotate with said ring gear,
    a first element of said second motor being an armature that is connected rigidly to a respective peripheral part of said sun gear to rotate with said sun gear,
    second element of said first electric motor being a first field assembly that is connected mechanically to said housing at a location to interact by its field with said armature on said ring gear, and
    a second element of said second electric motor being a second field assembly that is connected mechanically to said housing at a location to interact by its field with said armature on said sun gear, and
    a shaft connected at a respective extension of said hub to rotate with it as driven by said planetary gears, sun gear and ring gear, wherein each said element of the respective one of said electric motors of each said integral combination is said armature thereof.

13. The combination motor and transmission device of claim 9, wherein said combined motor and transmission device has at least one rotating member which is provided with a large moment of inertia about the axis of its rotation, whereby said device is useful as a flywheel means for storage of energy as rotational kinetic energy.

14. A combination motor and transmission device according to claim 7, included in each drive wheel of a vehicle with at least two drive wheels, for rotating at least a respective pair of drive wheels of the vehicle for propelling the vehicle, each said drive wheel having a respective one of said motor and transmission devices incorporated with it wheel assembly.

15. A motor and transmission device according to claim 14, said vehicle comprising of four of said wheels, each with its respective one of said motor and transmission devices incorporated within the respective wheel assembly.

16. A motor and transmission device according to claim 14, comprising each said motor and transmission device being incorporated within the wheel assembly of the respective wheel.

17. A motor and transmission device according to claim 15, comprising each said motor and transmission device weighing 40 or less pounds.

18. A combination motor and transmission device according to claim 15, comprising each said motor and transmission device weighing 35 pounds or less.

19. A combination motor and transmission device according to claim 13, combined into a conventional vehicle so as to be operatively connected with a pair of the drive wheels of the vehicle as said flywheel means for storing energy for use by the vehicle when needed, the energy stored in said flywheel means being input via at least one of said first and second input means and from regenerative braking by said pair of drive wheels.

20. The combination motor and transmission device of claim 8, wherein each said integral combination has a common central axis along which each of said two elements thereof is aligned, and each said integral combination is supported by a single respective bearing in the vicinity of said central axis and adjacent said housing.

21. A combination motor and transmission device comprising
first power input means for receiving a first input of electrical power,
second power input means for receiving a second input of electrical power,
power conversion mean for converting said electrical power of said first and second input for output as mechanical power, said power conversion means including a mechanical power transmission unit, said power transmission unit having two inputs for respectively receiving mechanical power corresponding to said first and second power input provided to said first and second power input means and an output or outputting the converted power as said rotational mechanical power, wherein the rotational speed of said output is continuously variable, and said power conversion means includes, for each of said first and second power inputs, a respective integral combination of a respective electric motor element and an element of said mechanical transmission unit,
wherein said transmission unit comprises a planetary gear unit which includes
an inner sun gear,
an outer ring gear which has an axis of rotation colinear with that of said inner sun gear,
a set of planetary gears held by a hub, said planetary gears being held by said hub to rotate n unison between said inner sun gear and outer ring gear, said planetary gears rotating relative to said hub in dependence on the difference in rotation between said inner and outer gears, said hub rotating in dependence on the sum of two rotational velocity components, the first rotational velocity component being the common rotational velocity of said sun gear an said ring gear, and the second velocity component being the difference between the rotational velocity of said sun gear and said ring gear, and
a housing surrounding at least in part said electric motors and transmission unit,
a first element of said first electric motor being an armature that is connected rigidly to a respective peripheral part of said ring gear to rotate with said ring gear,
a first element of said second motor being an armature that is connected rigidly to a respective peripheral part of said hub to rotate with said hub,
a second element of said first electric motor being a first field assembly that is connected mechanically to said housing at a location to interact by its field with said armature on said ring gear,
a second element of said second electric motor being a second field assembly that is connected mechanically to said housing at a location to interact by its field with said armature on said hub,
a shaft connected to said sun gear to rotate with it as driven by said planetary gears, hub and ring gear,
a wheel-support spindle connected to said housing coaxially with an axis of rotation of said second shaft, said wheel-support spindle being hollow along said axis of said second shaft to accept said second shaft therein,
a wheel with rim and bearing means to rotate on said wheel-support spindle, and
said shaft extending out from said housing to connect with said wheel via said rim and bearing means for rotating said wheel.

22. A combination motor and transmission device comprising
first power input means for receiving a first input of electrical power,
second power input means for receiving a second input of electrical power,
power conversion means for converting said electrical power of said first and second inputs for output as mechanical power, said power conversion means including a mechanical power transmission unit, said power transmission unit having two inputs for respectively receiving mechanical power corresponding to said first and second power inputs provided to said first and second power input means and an output for outputting the converted power as rotational mechanical power, wherein the rotational speed of said output si continuously variable, and said power conversion means includes, for each of said first and second power inputs, a respective integral combination of a respective electric motor element and an element of said mechanical transmission unit, wherein said transmission unit comprises a planetary gear unit which includes an inner sun gear, an outer ring gear which has an axis of rotation colinear with that of said inner sun gear.

a set of planetary gears held by a hub, said planetary gears being held by aid hub to rotate in unison between said inner sun gear and outer ring gear, said planetary gears rotating relative to said hub in dependence on the difference in rotation between said inner and outer gears, said hub rotating in dependence on the sum of two rotational velocity components, the first rotational velocity component being the common rotational velocity of said sun gear and said ring gear, and the second velocity component being the difference between the rotational velocity of said sun gear and said ring gear, and a housing surrounding at least in part said electric motors and transmission unit, a first element of said first electric motor being an armature that is connected rigidly to a respective peripheral part of said ring gear to rotate with said ring gear, a first element of said second motor being an armature that is connected rigidly to a respective peripheral part of said sun gear to rotate with said sun gear, a second element of said first electric motor being a first field assembly that is connected mechanically to said housing at a location to interact by its field with said armature on said ring gear, and a second element of said second electric motor being a second field assembly that is connected mechanically to said housing at a location to interact by its field with said armature on said sun gear, and a shaft connected at a respective extension of said hub to rotate with it as driven by said planetary gears, sun gear and ring gear, wherein each said element of the respective one of said electric motors of each said integral combination is said armature thereof, a wheel-support spindle connected to said housing coaxially with an axis of rotation of said second shaft, said wheel-support spindle being hollow along said axis of said second shaft to accept said second shaft therein, a wheel with rim and bearing means to rotate on said wheel-support spindle, and said shaft extending out from said housing to connect with said wheel via said rim and bearing means for rotating aid wheel.

23. A combination motor and transmission device comprising first power input means for receiving a first input of electrical power, second power input means for receiving a first input of electrical power, power conversion mean for converting said electrical power of said first and second inputs for output, said power conversion means including a mechanical power transmission unit, said power transmission unit having tow inputs for respectively receiving mechanical power corresponding to said first and second power inputs provided to said first and second power input means and an output for outputting the converted power as rotational mechanical power, wherein the rotational speed of said output is continuously variable, and said power conversion means includes, for each of said first and second power inputs, a respective integral combination of a respective electric motor element and an element of said mechanical transmission unit, wherein said transmission unit comprises a differential unit which includes a pair of opposing drive gears, corresponding to the two inputs of said transmission unit, a pair of pinion gears rotating on a first shaft between said pair of opposing drive gears, a second shaft connected at a first end perpendicularly to the center of said first shaft, the other end of said second shaft providing said rotational mechanical power output, and a housing surrounding at least in part said drive gears, pinion gears, first shaft and second shaft, wherein each said integral combination comprises a respective one of said drive gears as the respective element of said transmission unit, each said drive gear being mechanically connected with the respective electric motor element, a wheel-support spindle connected to said housing coaxially with an axis of rotation of said second shaft, said wheel-support spindle being hollow along said axis of said second shaft to accept said second shaft therein, a wheel with rim and bearing means to rotate on said wheel-support spindle, and said second shaft extending out from said housing to connect with said wheel via said rim and bearing means for rotating said wheel.

24. The combination motor and transmission device of claim 23, comprising a further housing on said wheel with said rim means, a wheel means connected to said second shaft, said wheel means including rim means and a wheel that is to be rotated by the device, and first brake means connected to said housing of said transmission unit and second brake means connected to said further housing, for braking the rotation of said wheel.

* * * * *

UNITED STATES PATENT AND TRADEMARK OFFICE
CERTIFICATE OF CORRECTION

PATENT NO. : 5,067,932  Page 1 of 1
APPLICATION NO. : 07/618934
DATED : November 26, 1991
INVENTOR(S) : Jonathan R. Edwards It is certified that error appears in the above-identified patent and that said Letters Patent is hereby corrected as shown below:

Column 11, line 1, change "AN TRANSMISSION DEICE" to --AND TRANSMISSION DEVICE--

Column 11, line 36, change "SAND" to --AND--

Column 11, line 42, change "EXTEND T WITHIN" to --EXTENT WITHIN--

Column 11, line 46, change "," to --.--

Column 11, line 47, change "DEICE" to --DEVICE--

Column 11, line 67, change "ON E OF SAID DRIVE GEARS A" to --ONE OF SAID DRIVE GEARS AND--

Column 13, line 3, change "," to --.--

Column 14, line 9, change "ROTATE N UNISON" to --ROTATE IN UNISON--

Signed and Sealed this

Seventeenth Day of October, 2006

JON W. DUDAS
*Director of the United States Patent and Trademark Office*